(12) United States Patent
Takahashi et al.

(10) Patent No.: US 11,856,616 B2
(45) Date of Patent: Dec. 26, 2023

(54) USER EQUIPMENT

(71) Applicant: NTT DOCOMO, INC., Tokyo (JP)

(72) Inventors: Hideaki Takahashi, Tokyo (JP); Teruaki Toeda, Tokyo (JP); Tooru Uchino, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 186 days.

(21) Appl. No.: 17/431,121

(22) PCT Filed: Feb. 13, 2019

(86) PCT No.: PCT/JP2019/005158
§ 371 (c)(1),
(2) Date: Aug. 13, 2021

(87) PCT Pub. No.: WO2020/165977
PCT Pub. Date: Aug. 20, 2020

(65) Prior Publication Data
US 2022/0141886 A1    May 5, 2022

(51) Int. Cl.
*H04W 52/36* (2009.01)
*H04W 74/08* (2009.01)
*H04W 56/00* (2009.01)

(52) U.S. Cl.
CPC ....... *H04W 74/0841* (2013.01); *H04W 52/36* (2013.01); *H04W 56/001* (2013.01); *H04W 74/0866* (2013.01)

(58) Field of Classification Search
CPC ............... H04W 52/36; H04W 56/001; H04W 74/0866
USPC .................. 370/329, 400, 401, 395
See application file for complete search history.

(56) References Cited

U.S. PATENT DOCUMENTS

| 11,595,924 B2* | 2/2023 | Kumar ................. H04W 72/27 |
| 2011/0051609 A1 | 3/2011 | Ishii et al. |
| 2015/0043512 A1 | 2/2015 | Jeong et al. |
| 2015/0103770 A1 | 4/2015 | Chang et al. |
| 2018/0368034 A1 | 12/2018 | Lin et al. |

FOREIGN PATENT DOCUMENTS

| JP | 2019-004316 A | 1/2019 |
| WO | 2009/028258 A1 | 3/2009 |
| WO | 2013/168776 A1 | 11/2013 |
| WO | 2018204863 A1 | 11/2018 |

OTHER PUBLICATIONS

Extended European Search Report issued in European Application No. 19914825.5 dated Jul. 12, 2022 (11 pages).

(Continued)

*Primary Examiner* — Dang T Ton
(74) *Attorney, Agent, or Firm* — Osha Bergman Watanabe & Burton LLP

(57) ABSTRACT

A UE (200) performs a random access procedure with a gNB (100). The UE (200) transmits to a network via a radio base station at least one of a synchronization signal block used for performing the random access procedure, a reception quality in the synchronization signal block, a group of random access preambles, and number of times for which power ramping was performed in the random access procedure.

4 Claims, 6 Drawing Sheets

(56) References Cited

OTHER PUBLICATIONS

Notice of Reasons for Refusal issued Japanese Application No. 2020-571968 dated Aug. 9, 2022 (8 pages).
Ericsson, ST Ericsson, "UE Measurement Support for the RACH Optimization Function", 3GPP TSG RAN WG2 Meeting #67, R2-094508, Shenzhen, China, Aug. 24-28, 2009 (3 pages).
Qualcomm Incorporated, "RACH report enhancements for SON", 3GPP TSG-RAN WG2 Meeting #103bis, R2-1814107, Chengdu, China, Oct. 8-12, 2018 (5 pages).
Ericsson, "3GPP RAN Overall REL-16 Scope", www.3gpp.org/ftp/tsg_ran/TSG_RAN/TSGR_80/Docs/RP-181191, Jan. 6, 2018 (22 pages).
International Search Report issued in PCT/JP2019/005158 dated Apr. 9, 2019 (2 pages).
Written Opinion of the International Searching Authority issued in PCT/JP2019/005158 dated Apr. 9, 2019 (4 pages).
NEC; "Remaining issues on SON RACH optimization"; 3GPP TSG RAN2 Meeting #67bis, R2-095574; Miyazaki, Japan; Oct. 12-16, 2009 (2 pages).
Samsung; "SON-RACH issues"; 3GPP TSG RAN WG2 #67, R2-094844; Shenzhen, China; Aug. 24-28, 2009 (3 pages).
Qualcomm Incorporated; "RACH report enhancements"; 3GPP TSG-RAN WG2 Meeting #103bis, R2-1814107; Chengdu, China; Oct. 8-12, 2018 (5 pages).
3GPP TS 36.300 V15.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)"; Dec. 2018 (363 pages).
3GPP TS 38.321 V15.4.0; "3rd Generation Partnership Project; Technical Specification Group Radio Access Network; NR; Medium Access Control (MAC) protocol specification (Release 15)"; Dec. 2018 (77 pages).
Office Action issued in Japanese Application No. 2020-571968; dated Nov. 8, 2022 (8 pages).
Office Action issued in counterpart Chinese Patent Application No. 201980091685.6 dated Oct. 12, 2023 (14 pages).

\* cited by examiner

FIG. 5

UEInformationRequest message

```
-- ASN1START
-- TAG-UEINFORMATIONREQUEST-START

UEInformationRequest ::=        SEQUENCE {
    rrc-TransactionIdentifier       RRC-TransactionIdentifier,
    criticalExtensions              CHOICE {
        ueInformationRequest            UEInformationRequest-IEs,
        criticalExtensionsFuture        SEQUENCE {}
    }
}

UEInformationRequest-IEs ::=    SEQUENCE {
    rach-ReportReq                  ENUMERATED {true}               OPTIONAL,    -- Need N
    lateNonCriticalExtension        OCTET STRING                    OPTIONAL,
    nonCriticalExtension            SEQUENCE {}                     OPTIONAL
}

-- TAG-UEINFORMATIONREQUEST-STOP
-- ASN1STOP
```

FIG. 6

UEInformationResponse message

```
-- ASN1START
-- TAG-UEINFORMATIONRESPONSE-START

UEInformationResponse ::=          SEQUENCE{
    rrc-TransactionIdentifier          RRC-TransactionIdentifier,
    criticalExtensions                 CHOICE {
        ueInformationResponse              UEInformationResponse-IEs,
        criticalExtensionsFuture           SEQUENCE {}
    }
}

UEInformationResponse-IEs ::=      SEQUENCE {
    rach-Report                        RACH-Report                         OPTIONAL,
    lateNonCriticalExtension           OCTET STRING                        OPTIONAL,
    nonCriticalExtension               SEQUENCE {}                         OPTIONAL
}

RACH-Report ::=                    SEQUENCE {
    selectedSSB                        SSB-Index,
    rsrp-Result                        RSRP-Range,
    selectedPreambleGroup              ENUMERATED {groupA, groupB},
    numberOfPreamblesSent              NumberOfPreamblesSent,
    numberOfPowerRamping               NumberOfPowerRamping,
    contentionDetected                 BOOLEAN,
    maxTxPowerReached                  BOOLEAN
...
}

NumberOfPreamblesSent ::=          INTEGER (1..256)

NumberOfPowerRamping ::=           INTEGER (1..256)

-- TAG-UEINFORMATIONRESPONSE-STOP
-- ASN1STOP
```

FIG. 7

| UEInformationResponse-IEs field descriptions |
|---|
| *rach-Report* <br> Information on the last successfully completed random access procedure. |

| RACH-Report field descriptions |
|---|
| *contentionDetected* <br> Used to indicate that contention was detected for at least one of the transmitted preambles. |
| *maxTxPowerReached* <br> Used in indicate that the maximum power level was used for the last transmitted preamble as in TS 38.321. |
| *numberOfPowerRamping* <br> Used to indicate the number of power rampings done during the last successful random access procedure. Corresponds to parameter PREAMBLE_POWER_RAMPING_COUNTER in TS 38.321. |
| *numberOfPreamblesSent* <br> Used to indicate the number of RACH preambles that were transmitted. Corresponds to parameter PREAMBLE_TRANSMISSION_COUNTER in TS 38.321 |
| *rsrp-Result* <br> RSRP value measured on the selected SSB. |
| *selectedPreambleGroup* <br> RA preamble group selected by MAC as in TS 38.321. Value groupA corresponds to Group A, and groupB corresponds to Group B. |
| *selectedSSB* <br> SSB selected for random access resource by MAC. |

USER EQUIPMENT

TECHNICAL FIELD

The present invention relates to a user equipment that performs a random access procedure.

BACKGROUND ART

3rd Generation Partnership Project (3GPP) specifies Long Term Evolution (LTE), and with the aim of further speeding, specifies LTE-Advanced (hereinbelow, the LTE includes the LTE-Advanced). Moreover, in the 3GPP, further, specification of a succeeding system of the LTE called 5G New Radio (NR) or Next Generation (NG) and the like is being considered.

In the LTE, automated optimization of parameters for a random access channel (RACH) is stipulated (Non-Patent Document 1). Accordingly, a part of self-optimization function of a network (SON: Self Organizing Networks) is carried out.

In the NR, in a case of a contention-based random access procedure of, a random access preamble (RA Preamble) that can be used is determined by an SS/PBSC (SSB) block selected by a user equipment (UE) (Non-Patent Document 2).

Specifically, the UE selects one of the SSBs for which a Reference Signal Received Power (RSRP) is larger than a threshold value notified from the network. Moreover, the UE selects one RA preamble randomly from among a plurality of RA Preambles tied to the SSB that has been selected.

Furthermore, it is possible to set the number of RA Preambles assigned to each SSB and the number of RA Preambles assigned to a group of the RA Preambles (groups A, B) in the UE from the network.

PRIOR ART DOCUMENT

Non-Patent Document

Non-Patent Document 1: 3GPP TS 36.300 V15.4.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), 3GPP, January 2019

Non-Patent Document 2: 3GPP TS 38.321 V15.4.0, 3rd Generation Partnership Project; Technical Specification Group Radio Access Network; NR; Medium Access Control (MAC) protocol specification (Release 15), 3GPP, January 2019

SUMMARY OF THE INVENTION

As mentioned above, in the NR, although the random access procedure is modified as compared to the LTE, automated optimization of the parameters of RACH is retrieved with higher accuracy.

Therefore, the present invention has been made in view of the above discussion and one object of the present invention is to provide a user equipment capable of contributing to the automated optimization of parameters related to the random access channel (RACH) with higher accuracy.

According to one aspect of the present invention a user equipment (UE 200) includes a control unit (control unit 230) that performs a random access procedure with a radio base station (gNB 100); and a transmitting unit (transmitting unit 210) that transmits to the radio base station a random access preamble on the basis of the random access procedure. The transmitting unit transmits to a network via the radio base station at least one of a synchronization signal block (SSB) used for performing the random access procedure, a reception quality (RSRP) in the synchronization signal block, a group of the random access preambles, and number of times for which a power ramping was performed in the random access procedure.

BRIEF DESCRIPTION OF DRAWINGS

FIG. 5 is a diagram showing a configuration example of UE Information Request.

FIG. 6 is a diagram showing a configuration example of UE Information Response.

FIG. 7 is a diagram showing an example for explaining each field constituting the UE Information Response.

MODES FOR CARRYING OUT THE INVENTION

Figure 1:
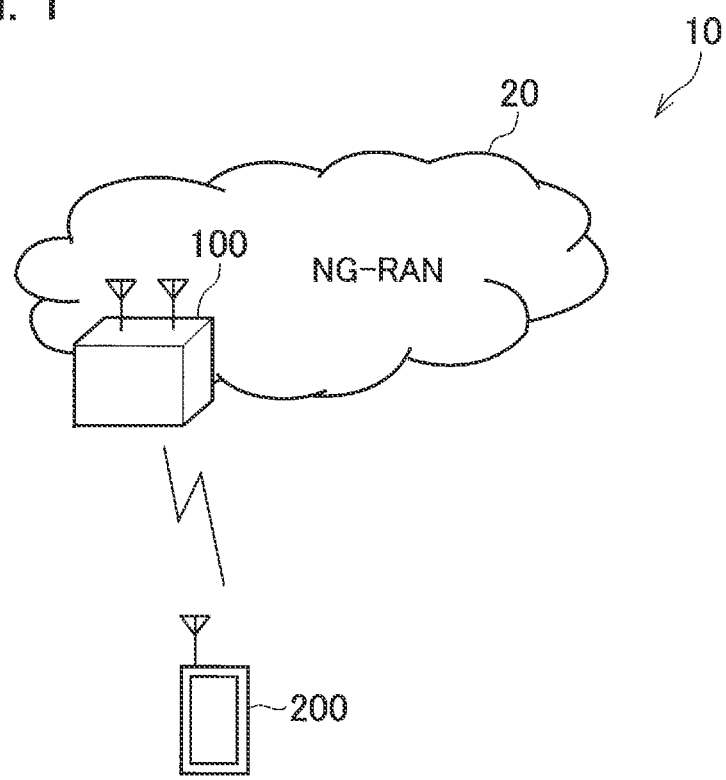
FIG. 1 is an overall schematic configuration diagram of a radio communication system 10.

Exemplary embodiments of the present invention are explained below with reference to the accompanying drawings. Note that, the same or similar reference numerals have been attached to the same functions and configurations, and the description thereof is appropriately omitted.

(1) Overall Schematic Configuration of Radio Communication System

FIG. 1 is an overall schematic configuration diagram of a radio communication system 10 according to the present embodiment. The radio communication system 10 is a radio communication system according to 5G New Radio (NR). The radio communication system 10 includes Next Generation-Radio Access Network 20 (hereinafter, "NG-RAN 20") and a user equipment 200 (hereinafter, "UE 200").

The NG-RAN 20 includes a radio base station 100 (hereinafter, "gNB 100"). A concrete configuration of the radio communication system 10, including the number of the gNBs and the UEs, is not limited to the example shown in FIG. 1.

The NG-RAN 20 actually includes a plurality of NG-RAN Nodes, in particular, the gNBs (or ng-eNB). Also, the NG-RAN 20 is connected to a core network (5GC, not shown) according to the 5G. The NG-RAN 20 and the 5GC may be simply expressed as "Network".

The gNB 100 is a radio base station according to the 5G. The gNB 100 performs a radio communication with the UE 200 according to the 5G. The gNB 100 and the UE 200 can handle, by controlling a radio signal transmitted from a plurality of antenna elements, Massive MIMO that generates a beam with a higher directivity, carrier aggregation (CA) that uses a plurality of component carriers (CC), dual connectivity (DC) in which a component carrier is transmitted simultaneously between a plurality of NG-RAN Nodes and the UE, and the like.

Moreover, the gNB 100 and the UE 200 perform a random access procedure (RA Procedure) and start radio communication. Specifically, the UE 200 in an idle state transmits a random access preamble via a random access channel (RACH), and starts the gNB 100 and the RA procedure.

In the present embodiment, the UE 200 is capable of performing self-optimization of a network, or specifically, is capable of transmitting various parameters (information) related to the RACH in order to realize automated optimization of RACH-related parameters with higher accuracy, to the gNB 100. Details of the parameters of the RA procedure and the RACH will be explained later.

Note that, in the present embodiment, a signal (message) making a request for various parameters (information) related to the RACH held in the UE 200 by the gNB 100 is called as UE Information Request and a signal (message) making a request for various parameters (information) related to the RACH to be transmitted to the gNB 100 by the UE 200 is called as UE Information Response. However, the appellation is not restricted to the abovementioned terms, and any appellation may be used provided that it is a signal (message) transmitted or received by the gNB 100 and the UE 200 for the RACH-related parameters (information).

(2) Functional Block Configuration of Radio Communication System

A functional block configuration of the radio communication system 10 will be explained below. Specifically, a functional block configuration of the UE 200 will be explained here.

Figure 2:
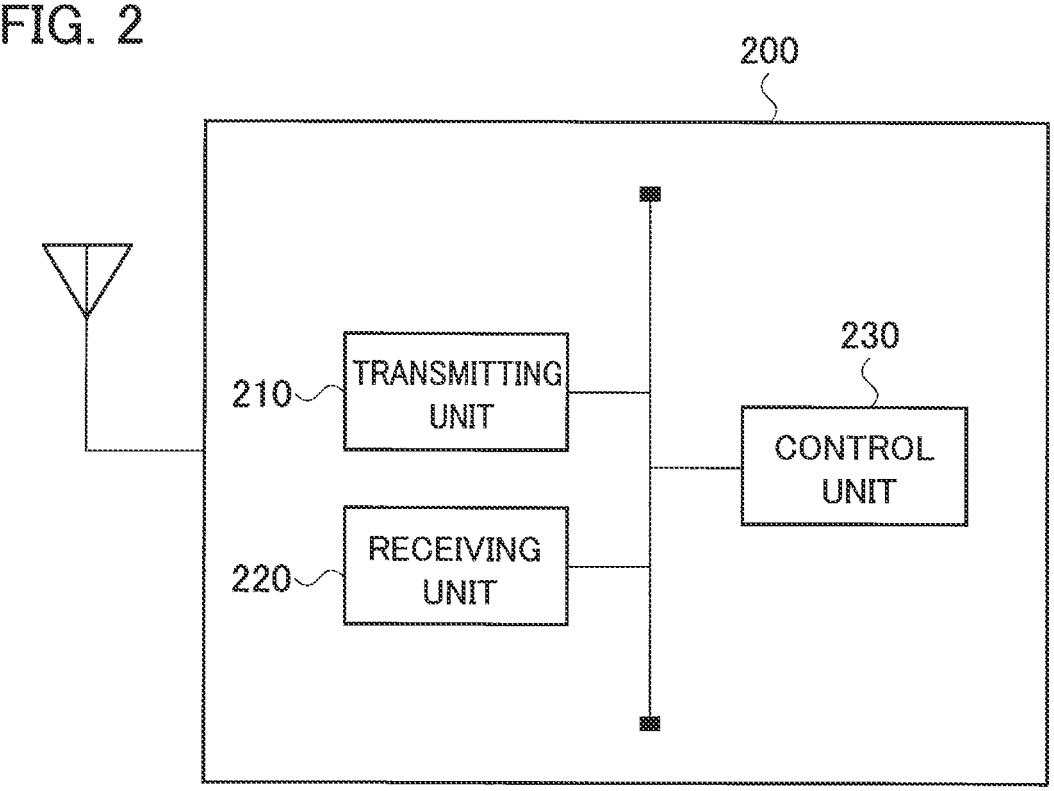
FIG. 2 is a functional block diagram of a UE 200.

FIG. 2 is a functional block diagram of the UE 200. As shown in FIG. 2, the UE 200 includes a transmitting unit 210, a receiving unit 220, and a control unit 230.

The transmitting unit 210 transmits an uplink signal (UL signal) according to the NR. The receiving unit 220 receives a downlink signal (DL signal) according to the NR.

Particularly, in the present embodiment, the transmitting unit 210 transmits a random access preamble (hereinafter, mentioned as RA Preamble) on the basis of the RA procedure stipulated by 3GPP technology standard, to the gNB 100.

The receiving unit 220 receives a random access response (RA Response) which is a response for the RA Preamble transmitted from the gNB 100. Moreover, the receiving unit 220 receives a UE Information Request which is a request for acquiring parameters related to the RACH transmitted from the gNB 100.

The control unit 230 performs control on the UL signal transmitted by the transmitting unit 210 and the DL signal received by the receiving unit 220.

Particularly, in the present embodiment, the control unit 230 performs the random access procedure with a radio base station. Specifically, the control unit 230 is capable of performing a contention-based (competitive) RA procedure stipulated in 3GPP TS 38.300 version 9.2.6 and a contention-free (polled) RA procedure.

Moreover, the control unit 230, upon receiving the UE Information Request from the gNB 100, gives an instruction to the transmitting unit 210 to transmit the parameters related to the RACH.

Specifically, the transmitting unit 210 transmits at least one of the RACH-related parameters cited below to the network (may be in NG-RAN 20 or 5GC) via the gNB 100.

synchronization signal block used for executing RA procedure reception quality in the synchronization signal block group of RA Preambles the number of times for which power ramping was performed in the RA procedure The 'synchronization signal block used for executing the RA procedure', specifically, signifies an SS/PBCH Block (SSB), and signifies an SSB that has been selected by a medium access control layer (MAC) for a resource of the random access.

The 'reception quality in the synchronization signal block', specifically, signifies a Reference Signal Received Power (RSRP) measured in the SSB selected.

The 'group of RA Preambles' signifies a group of RA Preambles (groups A, B) selected by the MAC.

'The number of times for which power ramping was performed in the RA procedure', specifically, signifies the number of times of increase in the transmission power (ramping) of the RACH performed from start to end of the RA procedure succeeded the previous time.

Note that, in the present embodiment, the abovementioned parameters are premised on a case in which the contention-based RA procedure is performed. Moreover, as mentioned above, the transmitting unit 210 transmits the synchronization signal block (SSB) selected in the MAC and the group of RA Preambles selected in the transmitting unit 210.

Furthermore, the transmitting unit 210, on the basis of the instruction from the control unit 230, transmits information indicating the number of RA Preambles transmitted in the RA procedure and presence or absence of contention in the RA procedure, similarly as the existing LTE.

Also, the transmitting unit 230, in the RA procedure, is capable of further transmitting information indicating whether or not the RA Preamble was transmitted with a predetermined maximum transmission power.

Specifically, the transmitting unit 210, by performing the power ramping for a plurality of times for making the transmission of the RA Preamble successful on the basis of the instruction from the control unit 230, transmits information indicating reaching the predetermined maximum transmission power when the predetermined maximum transmission power that has been stipulated in advance is reached. The information is called maxTxPowerReached.

(3) Operation of Radio Communication System

Next, an operation of the radio communication system 10 will be explained below. Specifically, an operation of reporting the RACH-related parameters by the UE 200 and performing the RA procedure by the gNB 100 and the UE 200 will be described below.

(3.1) RA Procedure

Figure 3:
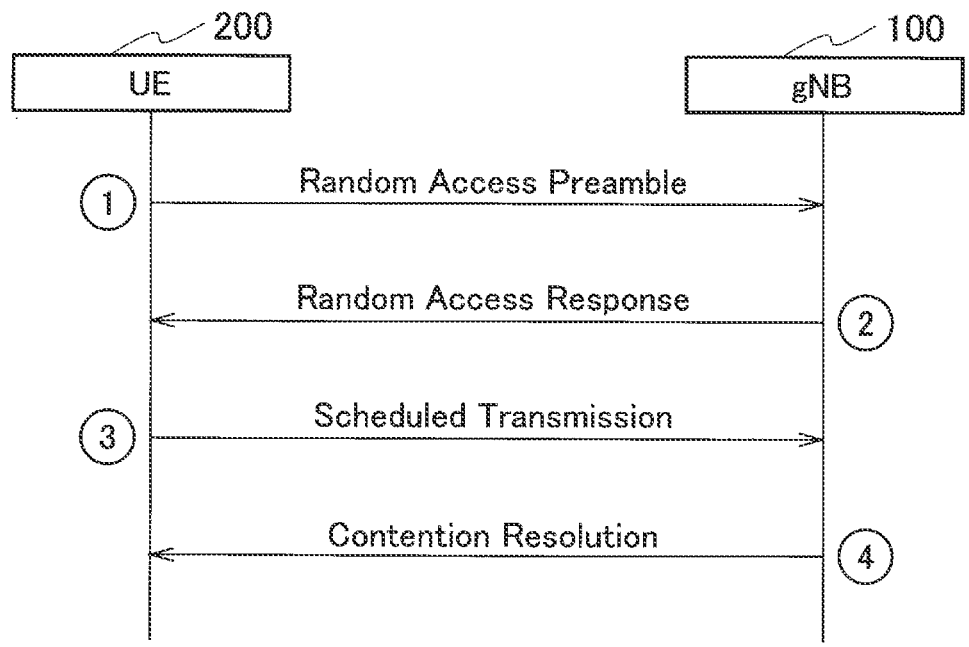
FIG. 3 is a diagram showing a sequence of an PA procedure.

FIG. 3 shows a sequence of an RA procedure. Specifically, FIG. 3 shows a sequence of a contention-based RA procedure.

As shown in FIG. 3, the UE 200 transmits an RA Preamble to the gNB 100 via the RACH (1 in the diagram, the same applies hereinafter). Specifically, the UE 200 selects any SSB for which the RSRP is larger (higher) than a threshold value notified from a network (NG-RAN 20), and selects one RA Preamble randomly from among the plurality of PA Preambles tied to the SSB selected.

Note that, the UE 200, in a case in which, there is no SSB having the RSRP larger than the threshold value, selects an arbitrary SSB.

The gNB 100, in accordance with the RA Preamble received, allocates a resource of UL and C-RNTI (Radio Network Temporary Identifier), and transmits an RA Response including the allocation to the UE 200 via a Downlink Shared Channel (DL-SCH) (2 in the diagram).

The UE 200, on the basis of the RA Response received, transmits a Radio Resource Control (RRC) setting request message as msg 3 to the gNB 100 (3 in the diagram). Moreover, for authenticating the UE 200, an ID of Non-Access Stratum (NAS) layer is to be included.

The gNB 100, on the basis of the RRC setting request message (msg 3) received, transmits an RRC setting message including cell setting information and the like for establishing an RRC connection as msg 4 to the UE 200 (4 in the diagram).

Note that, in a case of contention-based RA procedure, as the UE 200 makes an attempt for transmission in the RACH without a permission in particular, when there is no response from the gNB 100, the UE 200 increases transmission power of the RACH, that is, the RA Preamble (power ramping), and makes an attempt for retransmission in the BACH.

(3.2) Operation of Reporting BACH-Related Parameters

Figure 4:
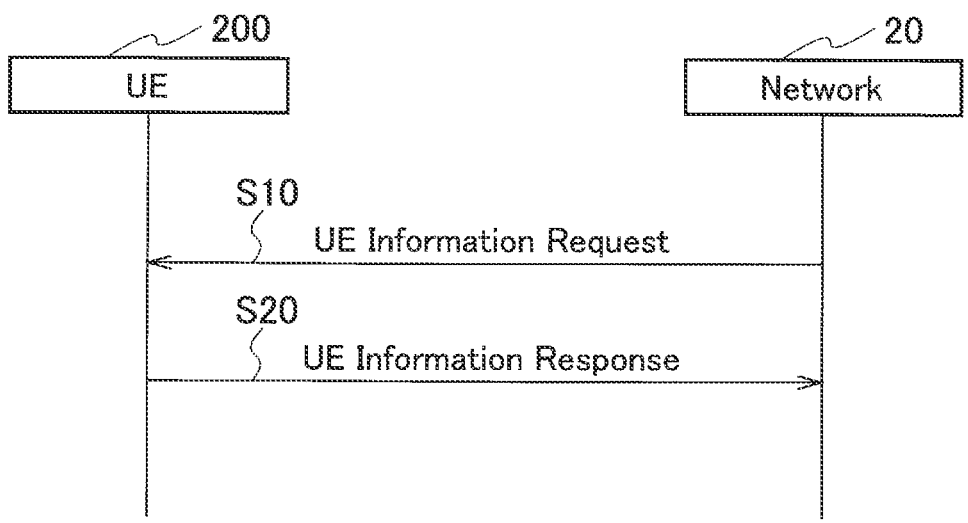
FIG. 4 is a diagram showing a report sequence of RACH-related parameters.

FIG. 4 shows a report sequence of the RACH-related parameters. As shown in FIG. 4, the gNB 100 transmits a UE Information Request requesting a report of the RACH-related parameters by the UE 200, to the UE 200 (Step S10). The UE Information Request is a type of a message of an RRC layer.

The UE 200, in response to the UE Information Request received, transmits a UE Information Response including the RACH-related parameters to the gNB 100.

Specifically, the UE 200, for transmitting the UE Information Response including the RACH-related parameters via a Signalling Radio Bearer (SRB) 1, delivers to a lower layer.

The UE 200 is capable of including various RACH-related parameters used for performing the RA procedure in the UE Information Response. Regarding the parameters, it is as already been mentioned, and details thereof will be explained further later.

(4) Configuration of EU Information Request and UE Information Response

Next, a configuration of the abovementioned UE Information Request and the UE Information Response will be explained below. Each of the UE Information Request and the UE Information Response is a type of message of the RRC layer as mentioned above.

FIG. 5 is a diagram showing a configuration example of the UE Information Request. FIG. 6 is a diagram showing a configuration example of the UE Information Response. FIG. 7 is a diagram showing an example for explaining each field constituting the UE Information Response.

The UE Information Request shown in FIG. 5 is transmitted from the network to the UE 200 via an SRB 1. The UE Information Request is for requesting a report of various RACH-related parameters used for performing the RA procedure to the UE 200.

The UE Information Response shown in FIG. 6 and FIG. 7 is transmitted from the UE 200 to the network via the SRB 1.

As mentioned above, the EU Information Response includes the synchronization signal block used for performing the RA procedure (selected SSB in the diagram), the reception quality in the synchronization signal block (rsrp-Result in the diagram), the group of RA Preambles (selectedPreambleGroup in the diagram), the number of RA Preambles transmitted in the RA procedure (numberOfPreamblesSent in the diagram), the number of times for which the power ramping was performed in the RA procedure (numberOfPowerRamping in the diagram), the presence or absence of contention in the RA procedure (contentionDetected in the diagram), and whether or not the predetermined maximum transmission power that has been set in advance has reached (maxTxPowerReached).

Note that, as mentioned above, all the parameters are not necessarily required to be included, and at least one of the synchronization signal block used for performing the RA procedure, the reception quality in the synchronization signal block, the group of the RA Preambles, and the number of times of power ramping performed in the RA procedure are to be included.

Moreover, regarding the reception quality in the synchronization signal block (SSB), only whether or not the RSRP of the SSB selected has surpassed the threshold value (rsrp-ThresholdSSB) may be reported.

Furthermore, as shown in FIG. 7, for the rach-Report including the abovementioned parameters (field), a value used in the RA procedure that succeeded the previous time is to be intended.

(5) Advantageous Effects

According to the abovementioned embodiment, the following advantageous effects are achieved. Specifically, the UE 200 transmits at least one of the synchronization signal block used for performing the PA procedure, the reception quality in the synchronization signal block, the group of the RA Preambles, and the power ramping performed in the RA procedure to the network.

Consequently, the network, by using the RACH-related parameters reported from the UE 200 is capable of facilitating the automated optimization of the parameters related to the BACH with higher accuracy. In other words, the UE 200 is capable of contributing to the automated optimization of the parameters related to the RACH with higher accuracy.

Specifically, the network is capable of statistically analyzing the parameters reported from the UE 200, and optimizing the RACH-related parameters in the NR.

Particularly, in a case of contention-based RA procedure premised on competition of the RACH with another UE, if it is possible to optimize RACH-related parameters with higher accuracy, accordingly, it is possible to inhibit an occurrence of contention while the RA procedure is being performed, and to contribute to shortening a time till the end of the RA procedure. Accordingly, it is possible to improve further a utilization efficiency of the network as a whole.

In the present embodiment, UE 200 is capable of further transmitting information (maxTxPowerReached) indicating whether or not the RA Preamble transmitted with the predetermined maximum transmission power in the RA procedure. Moreover, the UE 200 is capable of transmitting information (contentionDetected) indicating the number of RA Preambles transmitted in the RA procedure (numberOfPreamblesSent) and the presence or absence of contention in the RA procedure.

Accordingly, the network is capable of facilitating the automated optimization of the RACH-related parameters with even higher accuracy by further using the information.

In the present embodiment, the UE 200 transmits the SSB selected in the MAC and the group of RA Preambles selected in the MAC. Consequently, the UE 200 is capable of transmitting the SSB selected along an operation regulation (TS38.321) of the MAC and the group of RA Preambles.

(6) Other Embodiments

Although the contents of the present invention have been described by way of the embodiments, it is obvious to those skilled in the art that the present invention is not limited to what is written here and that various modifications and improvements thereof are possible.

For example, in the abovementioned embodiment, the explanation was made by citing an example of contention-based RA procedure. However, the reporting of the abovementioned RACH-related parameters may be applied to the contention-free (polling-based) RA procedure.

Moreover, in the abovementioned embodiment, the RSRP was used as the reception quality in the SSB selected. However, it may not be necessarily restricted to the RSRP, and it may be another index (for example, Reference Signal Received Quality (RSRQ)) indicating the reception quality.

Moreover, the block diagram used for explaining the embodiments (FIG. 2) shows blocks of functional unit. Those functional blocks (structural components) can be realized by a desired combination of at least one of hardware and software. Means for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (component) that causes transmitting may be called a transmitting unit or a transmitter. For any of the above, as explained above, the realization method is not particularly limited to any one method.

Figure 8:
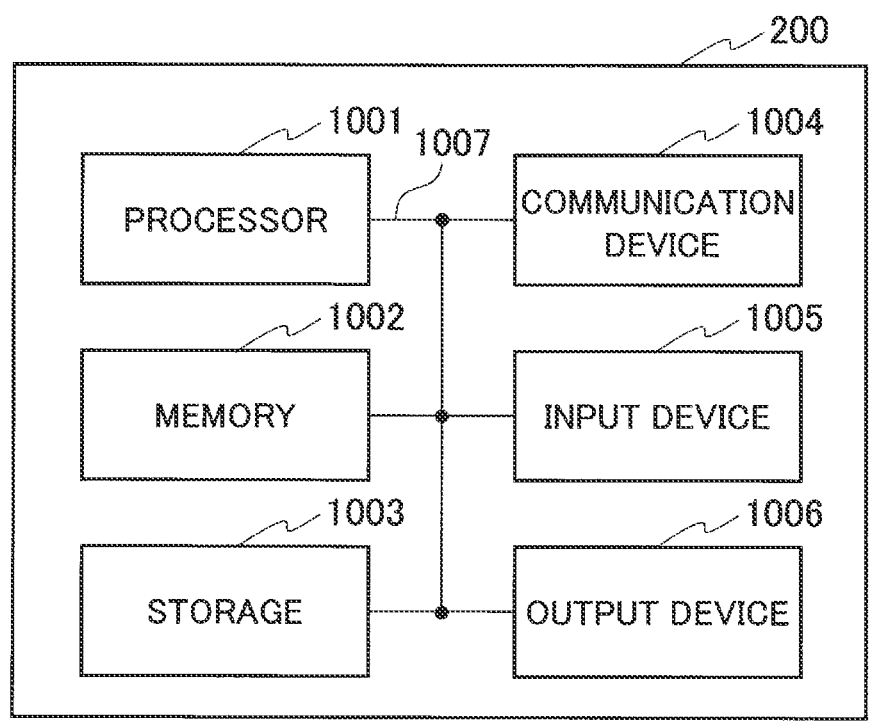
FIG. 8 is a diagram showing an example of a hardware configuration of the UE 200.

Furthermore, the UE 200 explained above can function as a computer that performs the processing of the radio communication method of the present disclosure. FIG. 8 is a diagram showing an example of a hardware configuration of the UE 200. As shown in FIG. 8, the UE 200 can be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. Hardware configuration of the device can be constituted by including one or plurality of the devices shown in the figure, or can be constituted by without including a part of the devices.

The functional blocks of the UE 200 (see FIG. 2) can be realized by any of hardware elements of the computer device or a desired combination of the hardware elements.

Moreover, the processor 1001 performs computing by loading a predetermined software (computer program) on hardware such as the processor 1001 and the memory 1002, and realizes various functions of the UE 200 by controlling communication via the communication device 1004, and controlling reading and/or writing of data on the memory 1002 and the storage 1003.

The processor 1001, for example, operates an operating system to control the entire computer. The processor 1001 can be configured with a central processing unit (CPU) including an interface with a peripheral device, a control device, a computing device, a register, and the like.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. The memory 1002 can be called register, cache, main memory (main memory), and the like. The memory 1002 can store therein a computer program (computer program codes), software modules, and the like that can execute the method according to the embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information there among. The bus 1007 can be constituted by a single bus or can be constituted by separate buses between the devices.

Further, the device is configured to include hardware such as a microprocessor, a digital signal processor (Digital Signal Processor: DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

Notification of information is not limited to that explained in the above aspect/embodiment, and may be performed by using a different method. For example, the notification of information may be performed by physical layer signaling (for example, Downlink Control Information (DCI), Uplink Control Information (UCI), upper layer signaling (for example, RRC signaling, Medium Access Control (MAC) signaling, notification information (Master Information Block (MIB), System Information Block (SIB)), other signals, or a combination of these. The RRC signaling may be called RRC message, for example, or can be RRC Connection Setup message, RRC Connection Reconfiguration message, or the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods explained above are exemplary and are not limited to the specific order mentioned above.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information, signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of a channel and a symbol may be a signal (signaling). Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter the same). For example, each of the aspects/embodiments of the present disclosure may be applied to a configuration that allows a communication between a base station and a mobile station to be replaced with a communication between a plurality of mobile stations (for example, may be referred to as Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms an uplink channel, a downlink channel, or the like may be read as a side channel.

Likewise, a mobile station in the present disclosure may be read as a base station. In this case, the base station may have the function of the mobile station.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as a, an, and the in English are added, in this disclosure, these articles shall include plurality of nouns following these articles.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS

10 Radio communication system
20 NG-RAN
100 gNB
200 UE
210 Transmitting unit
220 Receiving unit
230 Control unit
1001 Processor
1002 Memory
1003 Storage
1004 Communication device
1005 Input device
1006 Output device
1007 Bus

The invention claimed is:

1. A terminal comprising:
a processor that performs a random access procedure; and
a transmitter that transmits to a network at least one of a synchronization signal block corresponding to the random access procedure and a reception quality in the synchronization signal block,
wherein the transmitter transmits a contentionDetected field that indicates detection of a contention in the random access procedure.

2. A radio base station comprising:
a processor that performs a random access procedure; and
a receiver that receives at least one of a synchronization signal block corresponding to the random access procedure and a reception quality in the synchronization signal block,
wherein the receiver receives a contentionDetected field that indicates detection of a contention in the random access procedure.

3. A radio communication method comprising:
performing, at a terminal, a random access procedure; and
transmitting to a network at least one of a synchronization signal block corresponding to the random access procedure and a reception quality in the synchronization signal block,
wherein a contentionDetected field that indicates detection of a contention in the random access procedure is transmitted.

4. A radio communication system including a terminal and a radio base station, wherein
the terminal comprises:
a processor that performs a random access procedure; and
a transmitter that transmits to a network at least one of a synchronization signal block corresponding to the random access procedure and a reception quality in the synchronization signal block,
wherein the transmitter transmits a contentionDetected field that indicates detection of a contention in the random access procedure, and
the radio base station comprises:
a receiver that receives at least one of the synchronization signal block and the reception quality,
wherein the receiver receives the contentionDetected field.

* * * * *